US006052894A

United States Patent [19]

Kamei et al.

[11] Patent Number: 6,052,894
[45] Date of Patent: Apr. 25, 2000

[54] ROTARY WIRE FEED DRUM FOR USE IN WIRE HARNESS ASSEMBLY

[75] Inventors: Kazuaki Kamei, Yamato; Souichi Watanabe, Yokohama, both of Japan

[73] Assignee: Molex Incorporated, Lisle, Ill.

[21] Appl. No.: 08/627,528

[22] Filed: Apr. 4, 1996

[30] Foreign Application Priority Data

Apr. 6, 1995 [JP] Japan .................................... 7-107000

[51] Int. Cl.[7] ...................................................... B23P 19/00

[52] U.S. Cl. ............................... 29/863; 29/749; 29/564.6

[58] Field of Search ............................... 29/564.6, 564.8, 29/742, 748, 749, 753, 755, 759, 861, 863, 865, 866, 868, 872; 33/1 N, 1 PT, 772, 773, 774, 732, 733, 734, 735, 736, 738, 739

[56] References Cited

U.S. PATENT DOCUMENTS

| | | | |
|---|---|---|---|
| 3,783,726 | 1/1974 | Marks | 83/355 |
| 3,872,584 | 3/1975 | Chick et al. | 29/630 |
| 4,310,967 | 1/1982 | Funcik et al. | 29/749 |
| 4,373,261 | 2/1983 | Long, Jr. | 29/861 |
| 4,559,702 | 12/1985 | Maack et al. | 29/759 |
| 4,608,746 | 9/1986 | Csakvary | 29/564.4 |
| 4,616,396 | 10/1986 | Matsui | 29/566.1 |
| 4,638,904 | 1/1987 | Randar et al. | 198/468.2 |
| 4,653,160 | 3/1987 | Thorkildsen et al. | 29/33 M |
| 4,729,152 | 3/1988 | Hammond et al. | 29/33 M |
| 4,903,403 | 2/1990 | Brown et al. | 29/861 |
| 5,033,188 | 7/1991 | Polliard et al. | 29/861 |
| 5,282,311 | 2/1994 | Tamura | 29/825 |
| 5,327,644 | 7/1994 | Tanaka et al. | 29/861 |
| 5,483,738 | 1/1996 | Watanabe et al. | 29/748 |

*Primary Examiner*—M. Rachuba
*Assistant Examiner*—T. Anthony Vaughn
*Attorney, Agent, or Firm*—Robert Zeitler; Charles S. Cohen

[57] ABSTRACT

A rotatable wire feed drum for use in the assembly of multiple connector wire harnesses includes a rotary drum of a given diameter and an outer circumferential surface which accommodate a plurality of wires. A first wire-clamping assembly is operatively connected to the wire feed drum and selectively clamps the wires to the drum in order to advance them with rotation of the drum. The wire feed drum may be utilized as a wire feed device in a wire harness assembly apparatus between a wire supply device and a wire terminating device. Feeding of selected wires is effected by clamping a set of selected wires to the wire feed drum and simultaneously unclamping a second set of wires at a location spaced from the feed drum and then rotating the wire feed drum.

16 Claims, 5 Drawing Sheets

ROTARY WIRE FEED DRUM FOR USE IN WIRE HARNESS ASSEMBLY

BACKGROUND OF THE INVENTION

The present invention generally relates to apparatuses used in forming multiple connector wire harnesses, and more particularly to such an apparatus having an improved wire feeding and measuring assembly which provides any desired combination of different wire lengths for the harnesses so formed.

Multiple connector wire harnesses are well known in the art and typically comprise a primary, or "parent" connector, a number of secondary, or "child" connectors and a plurality of wires extending in sets of different wire lengths between and terminated at their opposite ends to the parent and child connectors. This type of wire harness is widely used in making electrical connections between different electric machines and apparatuses.

The lengths between the parent connector and its subsidiary child connectors depends on the distances between different electric machines and apparatuses to be connected. It is therefore necessary to provide multiple connector wire harnesses having desired combinations of different wire lengths to meet occasional demands for connecting electric machines and apparatuses placed at different positions.

In a conventional wire measuring apparatus, the desired different lengths of wires are fed linearly. This linear feeding advantageously permits such feeding without significantly bending or curling any of the wires. However, such a wire feeding apparatus occupies a relatively large space. In another conventional wire feeding apparatus, the wires are fed by pushing selected sets of wires down into a cavity for a predetermined distance which results in the desired wire length. This is done with the aid of associated wire loopers. However, it has been found that in using loopers to feed wires, significant curling may be imparted to the wires, even though the feeding apparatus occupies a relatively small space.

SUMMARY OF THE INVENTION

It is therefore an object of the present invention to provide a wire feeding apparatus which overcomes the disadvantages of the prior art feeding apparatuses described above.

It is another object of the present invention to provide a reliable wire feeding apparatus which requires a relatively small space for operation and which facilitates the exact feeding of different lengths of wire sets without causing any significant curling in the wires.

To attain this and other objects, the present invention provides for a rotary drum as the wire measuring component in a multiple connector harness assembly apparatus, wherein each wire harness comprises a parent connector, a series of child connectors and wires of different lengths terminated at their opposing ends to the parent and child connectors. The assembly apparatus of the present invention further comprises a wire supply section for supplying wires from storage, a wire feeding section for feeding wires of different lengths as required, and a harness forming section for terminating parent and child connectors to the opposing ends of different lengths of wires.

The wire feeding and measuring component comprises a rotary drum having a plurality of grooves formed in its outer circumferential surface which accommodate wires advanced from the wire supply. A flexible cover may extend over a substantial amount of the circumference of the drum which retains the wires in the outer grooves. One end of the cover may engage an associated tensioning assembly, and the other end may be secured to the drum. A wire-clamping assembly is rotatable with the drum to clamp selective wires to the drum.

The wire supply section may include another wire-clamping assembly located upstream of the wire-clamping assembly mentioned above, and is utilized for selectively clamping the wires in synchronization with its downstream wire-clamping assembly counterpart. Feeding of selected wires is effected by rotating the drum when the upstream wire-clamping assembly releases selected wires, while the downstream wire-clamping assembly clamps the selected wires. Feeding of the remaining wires is prevented by utilizing the upstream wire-clamping assembly to clamp the remaining wires.

The rotary drum is rotated to measure desired lengths of wires, and the wire-measuring drum has a diameter large enough to cause no significant bending or curling of the wires, and therefore, no significant curling is imparted to the measured wires. The rotary drum does not require a large space for installation and operation despite its capability of measuring relatively long wires on the circumference of the drum. The upstream and downstream wire-clamping assemblies may include pneumatic operators and associated clamping members in any number to match the number of wires to be fed.

These and other objects, features and advantages of the present invention will be clearly understood through a consideration of the following detailed description.

BRIEF DESCRIPTION OF THE DRAWINGS

In the course of the following description of the detailed description, reference will be made to the attached drawings wherein like reference numerals identify like parts and wherein.

DETAILED DESCRIPTION OF THE PREFERRED EMBODIMENTS

Figure 2:
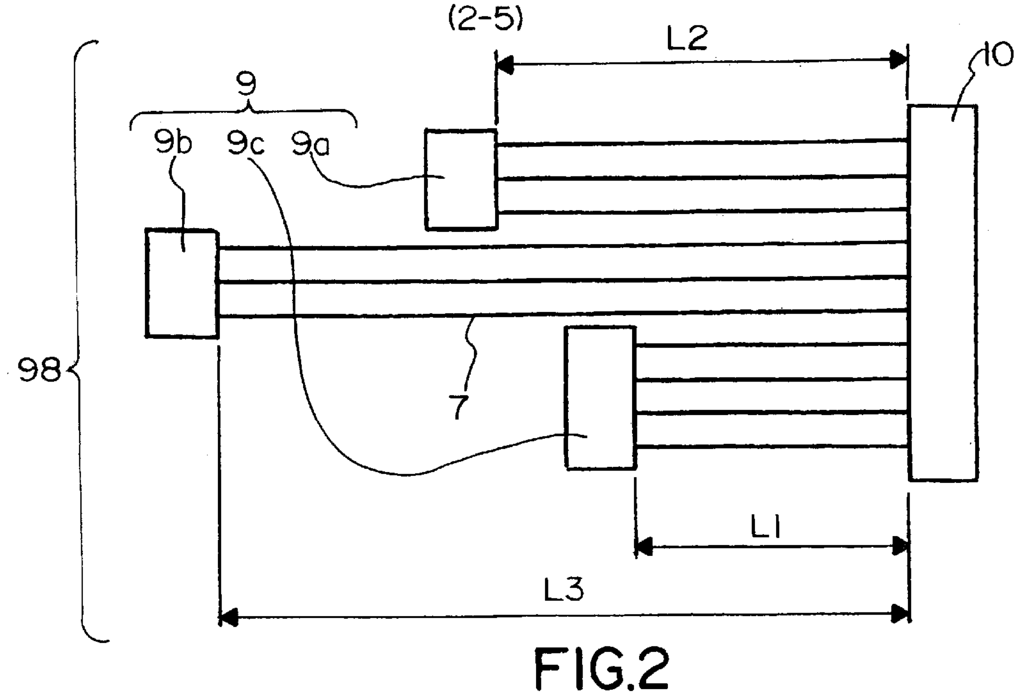
FIG. 2 is a plan view of a wire harness terminated to multiple connectors which is produced using the apparatus of FIG. 1.

The present invention is directed to a wire measuring apparatus which utilizes a novel rotary wire measuring drum to form wire harnesses 98. Such a harness is illustrated in FIG. 2 where it can be seen that a series of a plurality of wires 7 of different lengths are terminated at their opposing ends by electrical connectors 9, 10. The connectors 9, 10 to which the wires 7 are terminated include a primary, or "parent" connector 10, and multiple secondary, or "child" connectors 9. Three such child connectors are illustrated in FIG. 2 at 9*a*, 9*b*, 9*c* and these connectors are terminated to sets of wires of different lengths L1, L2 and L3.

In the multiple connector harness 98 shown in FIG. 2, ten different wires 7 of three different lengths L1, L2, and L3 are segregated into three groups by way of their lengths. Specifically, the ends of three wires 7 having a length L2 are terminated to the three-circuit child connector 9*a*; the ends of another three wires having a length L3 are connected to a second three-circuit child connector 9*b*; and, the ends of the remaining four wires having a length L1 are connected to the four-circuit child connector 9*c*, and the opposing ends of all of the harness wires are connected to the ten-circuit parent connector 10.

In general, the wire measuring apparatus 100 of the present invention selects different sets of wires from the plurality of wires 7 and feeds the selected wires over different desired lengths in terms of different rotational angles $\theta_1$, $\theta_2$ & $\theta_3$ of a wire feeding assembly, thereby providing any desired combination of different wire lengths for termination in a multiple connector wire harness.

Figure 1:
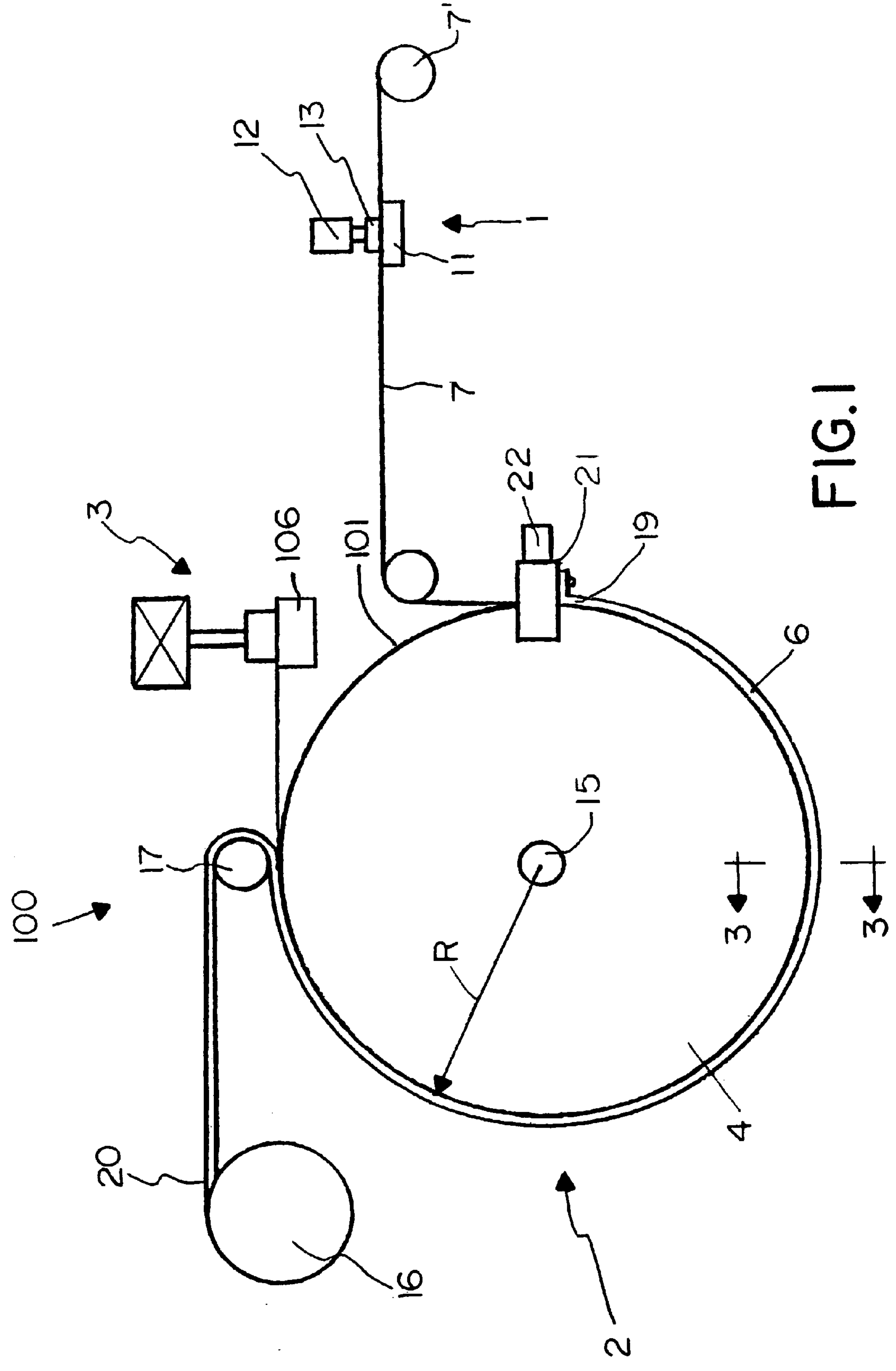
FIG. 1 is an end view of a wire measuring apparatus incorporating a rotary feed drum constructed in accordance with the principles of the present invention.

As seen best in FIG. 1, the apparatus 100 comprises a wire supply section 1 which supplies a plurality of wires 7 from an endless wire supply 7', a wire feeding assembly 2 for feeding wires of different lengths as required, and, a harness termination mechanism 3 for terminating the parent and child wire connectors 10, 9 to opposing ends of the wires 7 of different lengths.

Figure 3:
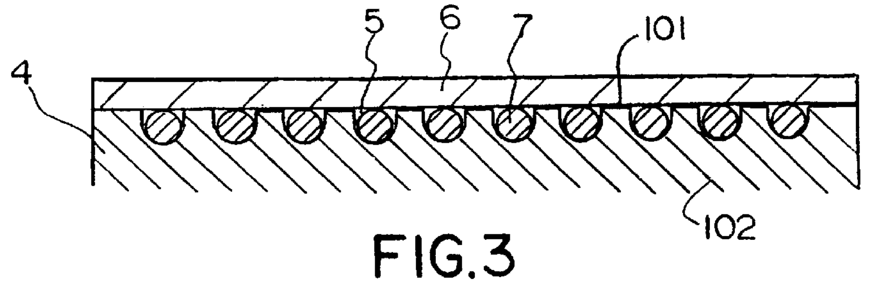
FIG. 3 is a partial sectional view of the rotary feed drum of the apparatus of FIG. 1, taken along lines 3—3 thereof.

The wire feeding section 2 of the apparatus utilizes a rotatable wire feed drum 4 of a given diameter and a series of circumferential grooves 5 (FIG. 3) formed in its outer circumferential surface 101 in order to accommodate the wires 7 of the wire supply. As illustrated in FIG. 3, each groove 5 may be semi-circular and accommodates a single wire 7 therein. The wires 7 are held within the grooves by a cover member, shown as a flexible belt 6, which extends over a substantial part of the circumference of the drum 4. As shown in FIG. 1, the cover belt 6 extends over more than one-half of the drum circumference. The cover belt engages the outer surface 101 of the wire feed drum 4 and extends substantially across the width of the drum 4 so that it retains the wires 7 in the grooves 5 of the drum 4 during operation of the apparatus 100. A wire-clamping assembly 21 is connected to the drum body 102, such as by screws 104 (FIG. 4), and extends thereover and in alignment therewith for clamping the wires 7 which extend around the drum 4.

Figure 5:
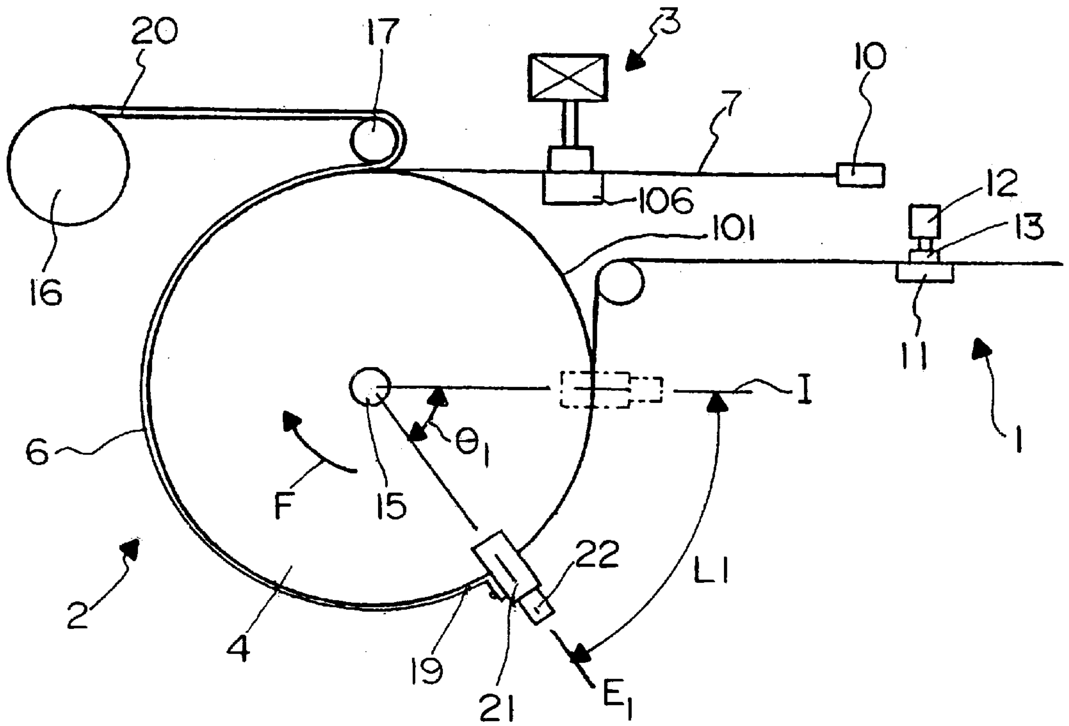
FIG. 5 is an end view of the apparatus of FIG. 1 illustrating the movement thereof which occurs during a first step of wire measuring.
Figure 7:
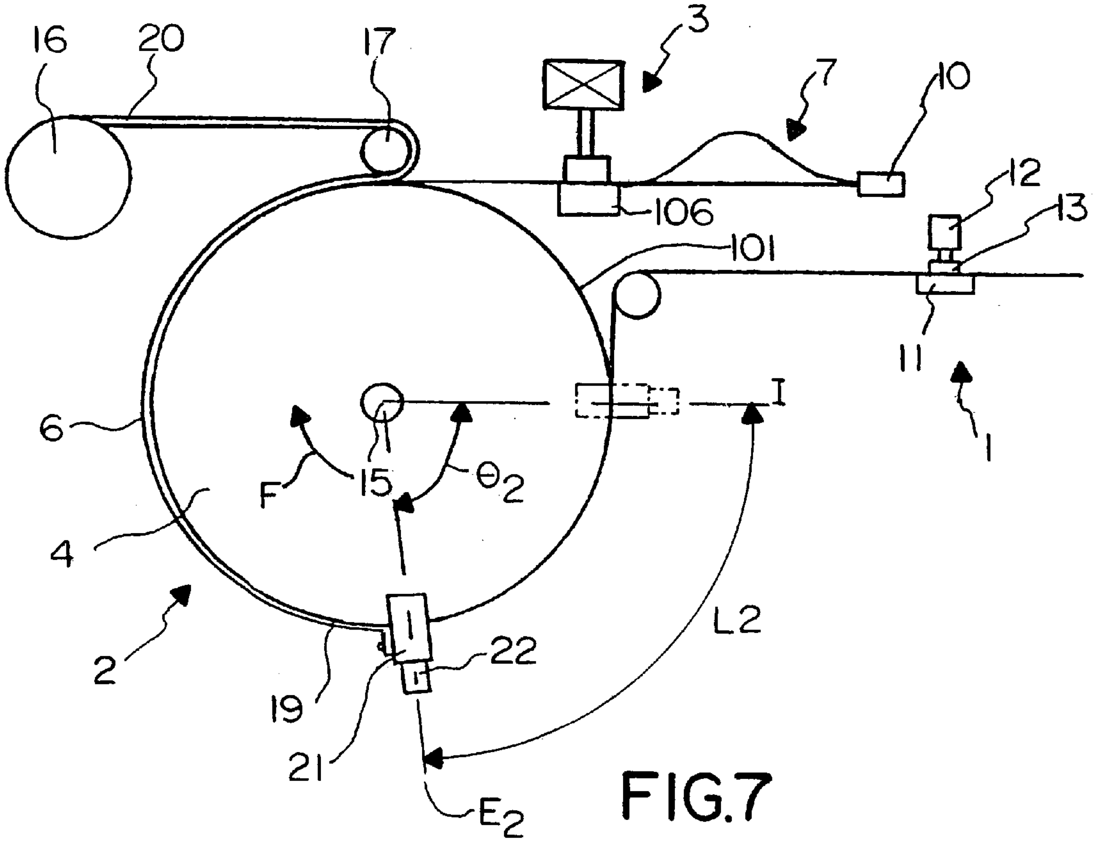
FIG. 7 is an end view of the apparatus of FIG. 1 illustrating the movement thereof which occurs during a second step of wire measuring.
Figure 9:
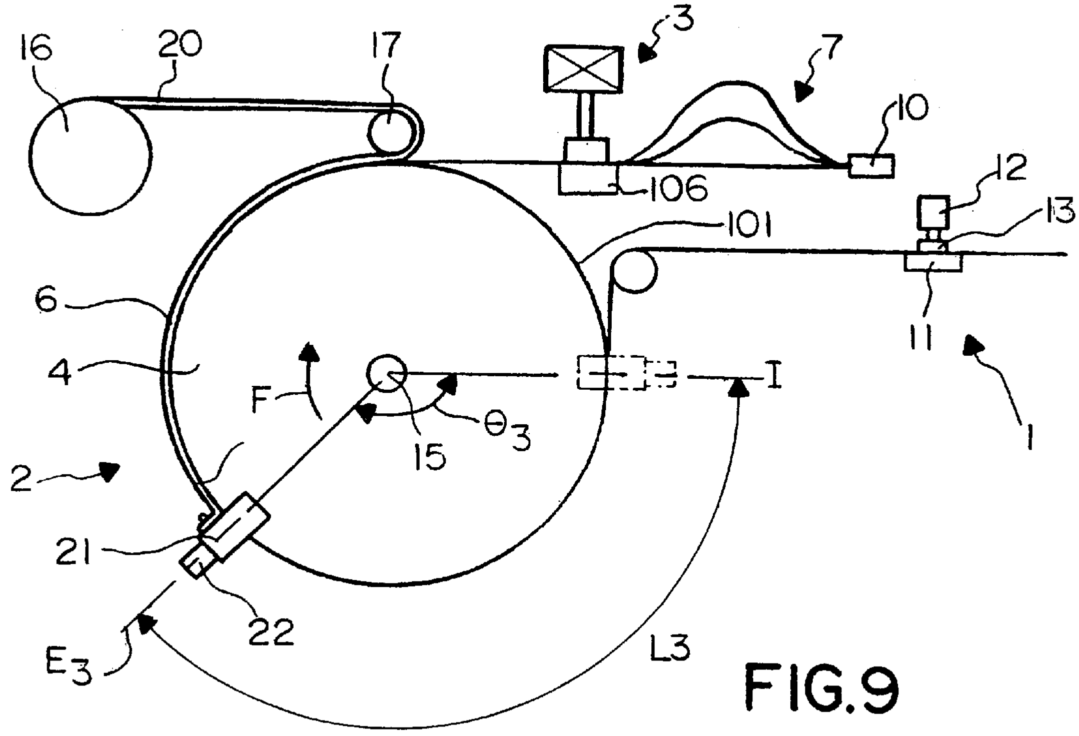
FIG. 9 is an end view of the apparatus of FIG. 1 illustrating the movement thereof which occurs during a third step of wire measuring.

As seen in FIG. 1, the drum 4 is mounted for rotation around a central axis 15. The drum 4 may be driven in rotation by any suitable means such as a servo motor, and preferably is electrically controlled in terms of its rotational angle so that the desired lengths L1, L2 & L3 of the sets of wires 7 for the completed wire harness 98 to be fed may be determined by the product of the radius R of the drum 4 and the various rotation angles $\theta_1$, $\theta_2$, $\theta_3$ of the drum 4 as shown in FIGS. 5, 7 & 9. As used in this detailed description, the radius R of the drum 4 is equal to the distance from the center of the axis 15 of the drum 4 to the center of the wires 7 extending in the drum grooves 5, as shown in FIG. 1. As shown in FIGS. 5, 7 & 9, the three exemplary rotation angles $\theta_1$, $\theta_2$, $\theta_3$ refer to the entire rotational extent of the wire feed drum 4 from its initial starting point I (FIG. 5) (as measured by the first wire-clamping assembly 21) to the respective endpoints $E_1$ (FIG. 5), $E_2$ (FIG. 7), $E_3$ (FIG. 9).

One end 19 of the cover belt 6 engages the rotary drum 4 by way of attachment to a first wire-clamping assembly 21, while the opposite end 20 of the cover belt 6 engages an associated tensioning means, shown as tension roller 16. This tension roller 16 is rotatable to feed or retract cover belt 6 along the arrow T of FIG. 1 in order to move with rotary drum 4. An idler roller 17 is used in association with the tension roller 16 and may be positioned as shown, where it generally abuts the drum 4 to assure that the cover belt 6 will extend for a predetermined circumferential distance along the outer surface 101 of the drum 4 and will contact the outer surface 101 of the wire feed drum 4. This circumferential distance extends between a fixed point at which the first wire-clamping assembly 21 is fixed to the drum body 102 to the point where the idler roller 17 is maintained. The cover belt 6 maintains all of the wires 7 in the drum grooves while it is rotating, thereby preventing any twisting of the wires 7.

Figure 4:
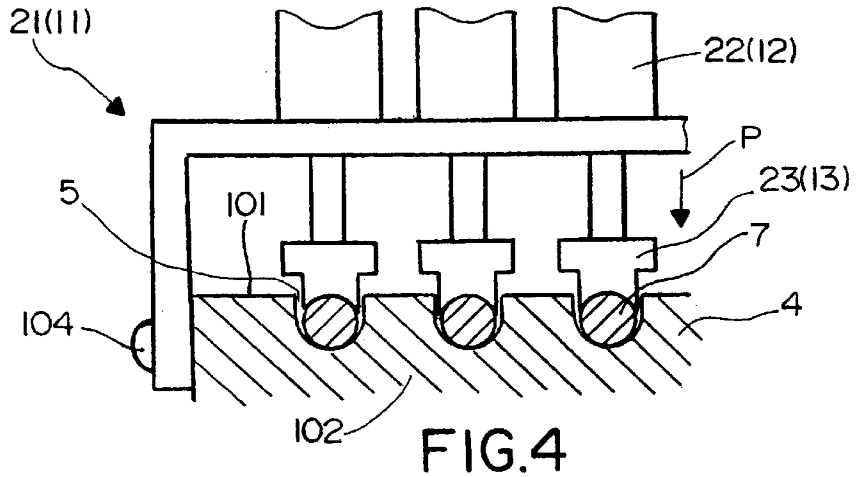
FIG. 4 is an enlarged partial end view of a wire-clamping means utilized with the apparatus of FIG. 1.

As part of the means used for clamping the wires 7 onto the drum 4 and for effectuating selective advancement of the wires 7, the wire supply section 1 includes a second, wire-clamping assembly 11 associated therewith and located upstream of the wire feed means 2 and upstream of the downstream wire-clamping assembly 21. This second wire-clamping assembly 11 may clamp the wires 7 as they are drawn from the endless wire supply 7' and maintains them in a side-by-side alignment prior to the winding of the wires 7 around the drum 4. Preferably, this side-by-side alignment matches the side-by-side alignment of the wires 7 when in place upon the drum outer working surface 101 in the grooves 5 thereof. Each of the two wire-clamping assemblies 11, 21 include suitable actuating means, such as respective associated pneumatic cylinders 12, 22 and clamping members 13, 23. The number of clamping members preferably equals the number of wires 7 to be fed, as shown in FIG. 4.

In operation, selected ones of the pneumatic cylinders 22 may be energized upon a signal from a control means (not shown) in order to actuate their associated clamping members 23 down in the direction indicated by arrow P, thereby pushing the wires 7 into the grooves of the drum 4 through its rotation angles $\theta_1$, $\theta_2$, $\theta_3$. The downstream wire-clamping assembly 22 is connected to the drum 4 and, therefore, it rotates along with the drum 4. The fixed wire clamping assemblies 11 are generally identical to movable wire clamping assemblies 21 except the clamping members 23 push the wires 7 into grooves 5 in drum 4 while clamping members 13 push the wires into contact with a fixed block.

The pneumatic cylinders of these wire-clamping assemblies 11, 21 are selectively controlled by a suitable associated electric control means (not shown) so that distinct sets of wires 7 may be selectively clamped and unclamped in unison. This synchronized operation is best explained by describing the sequence in which the components of the apparatus 100 are actuated.

Accordingly, the manner in which the wire measuring apparatus feeds selected wires 7 will now be described. The feeding of selected wires is effected by rotation of the drum 4. A first set of wires to be fed for the wire harness 98 is selected, and the upstream wire-clamping assembly 11 is retracted to release its hold upon this first set of wires (i.e., it unclamps them). At the same time, the downstream wire-clamping assembly 21 is actuated to clamp only this first selected set of wires into contact with the drum grooves 5, and not any of the remaining wires. The feeding of the remaining wires 7 by the drum 4 is prevented because the upstream wire-clamping assembly 11 clamps only the remaining wires while the downstream wire-clamping assembly unclamps the remaining wires 7.

The rotary drum 4 is rotated in the direction indicated by arrow F through such an angle $\theta_1$ that the product of the wire feed drum radius R and the angle of rotation $\theta_1$ corresponds to the circumferential length of the angle $\theta_1$ which is equal to the length L1 desired for the first selected set of wires, thus feeding the selected set of wires 7 the desired length L1. It can be seen then that any desired combination of different wire lengths can be provided by selectively actuating the upstream and downstream wire-clamping assemblies 11, 22 depending on which wires are selected to be fed.

When manufacturing a multiple connector wire harness 98 of the type illustrated in FIG. 2, the apparatus is initially positioned so as to locate the downstream wire-clamping assembly 21 in an initial position as shown in FIG. 1. The ends of all of the wires 7 are positioned at harness termination mechanism 3. The forming of a multiple connector wire harness 98 then begins with the termination of all of the wire ends in the harness termination mechanism 3 as is known in the art to the primary or parent connector 10, held in place on a termination platform 106 by a suitable means. Such a termination may be easily effected by using two-part connectors of the IDT (insulation displacement technology) type in association with a press mechanism which presses one connector part into engagement with the other connector part, thereby forcing terminal blades through the wire insulation and into contact with the wire internal conductor held between the two connector parts.

The feeding and termination of the selected sets of wires is effected in a sequential order of short to long wires. That is, the wires of length L1 are advanced and terminated first, the wires of length L2 are terminated second and the wires of length L3 are terminated last.

Figure 6:
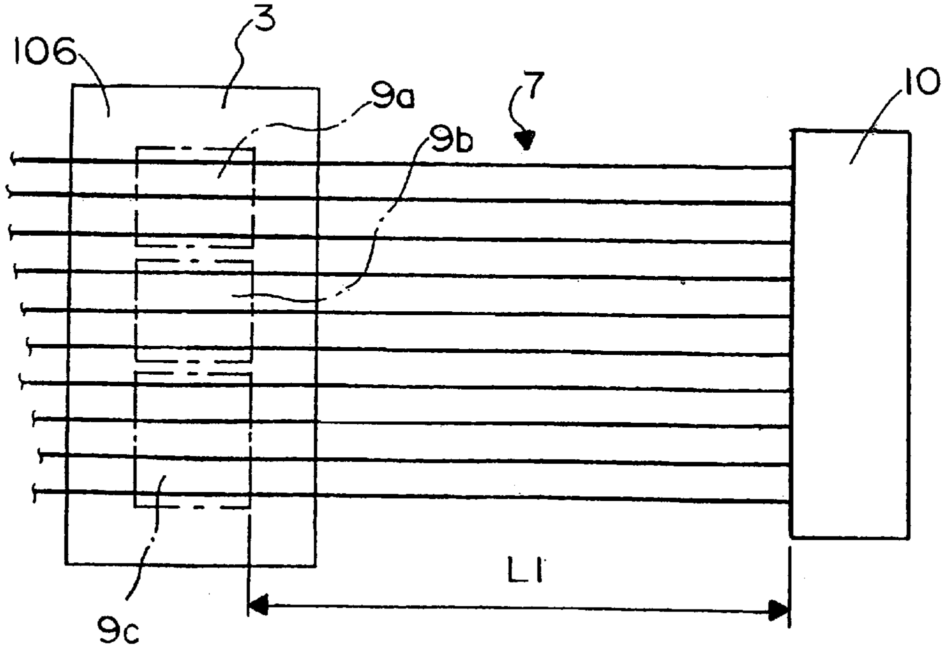
FIG. 6 is a partial plan schematic view of the apparatus of FIG. 1 illustrating how the series of wires are aligned at the first step of wire measuring shown in FIG. 5.

After terminating all of the first ends of the wires 7 to the parent connector 10, all of the wires 7 are released by the upstream wire-clamping assembly 11, while at the same time all of the wires 7 are clamped at the downstream wire-clamping assembly 21. As the first wire measuring or feeding step, the rotary drum 4 is rotated in the direction indicated by arrow F through an angle $\theta_1$ to feed all of the wires 7 for the shortest length L1 of the first selected wire set as seen in FIGS. 5 & 6. This movement of the wire feed drum 4 occurs as the terminated parent connector element 10 advances away from the termination station platform 106 a distance equal to L1. In addition, belt 6 also rotates about tension roller 16 to take up the slack in the belt.

Then, four of the ten wires 7, which comprise the first selected set of wires are cut and terminated to the first secondary, or child, connector 9*c*. These four selected wires 7 are then clamped by the upstream wire-clamping assembly 11, while they are unclamped by the downstream wire-clamping assembly 21, thus preventing further feeding of these four selected wires 7 as the wire feed drum 4 rotates further. The remaining six wires 7 are unclamped at the upstream wire-clamping assembly 11, and simultaneously, clamped at the downstream wire-clamping assembly 21 thereby permitting further feeding of these remaining six wires 7 when the wire feed drum 4 rotates further.

Figure 8:
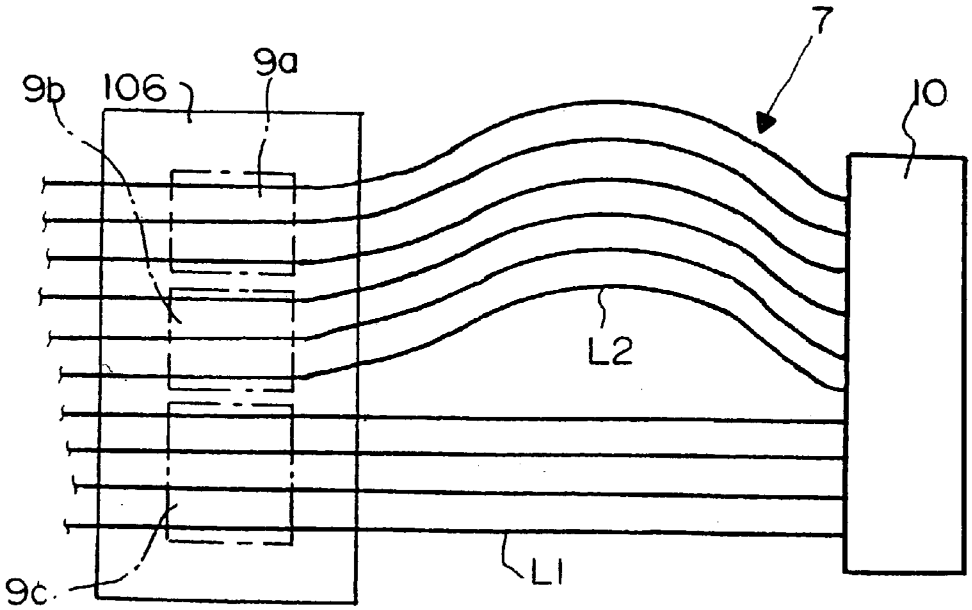
FIG. 8 is a partial plan schematic view of the apparatus of FIG. 1 illustrating how the series of wires are aligned at the second step of wire measuring shown in FIG. 7.

As a second measuring step, as shown in FIG. 7, the wire feed drum 4 is rotated as indicated by arrow F for an additional amount $(\theta_2-\theta_1)$ such that its total rotation from its initial starting point I (FIG. 1) is equal to angle $\theta_2$ to thereby feed the six remaining wires 7 for a distance equal to the intermediate length L2 of the second selected wire set. As these wires are fed, they buckle upwardly or downwardly downstream of the harness termination mechanism 3 as seen in FIGS. 7 & 8. Three of these six remaining wires 7 which comprise the second selected wire set are then cut and terminated to a second distinct secondary or child connector 9*a*, and these three wires (i.e., the second selected wire set) are then clamped at the upstream wire-clamping assembly 11 and unclamped at the downstream wire-clamping assembly 21, thereby preventing further feeding of this second selected set of wires 7.

Figure 10:
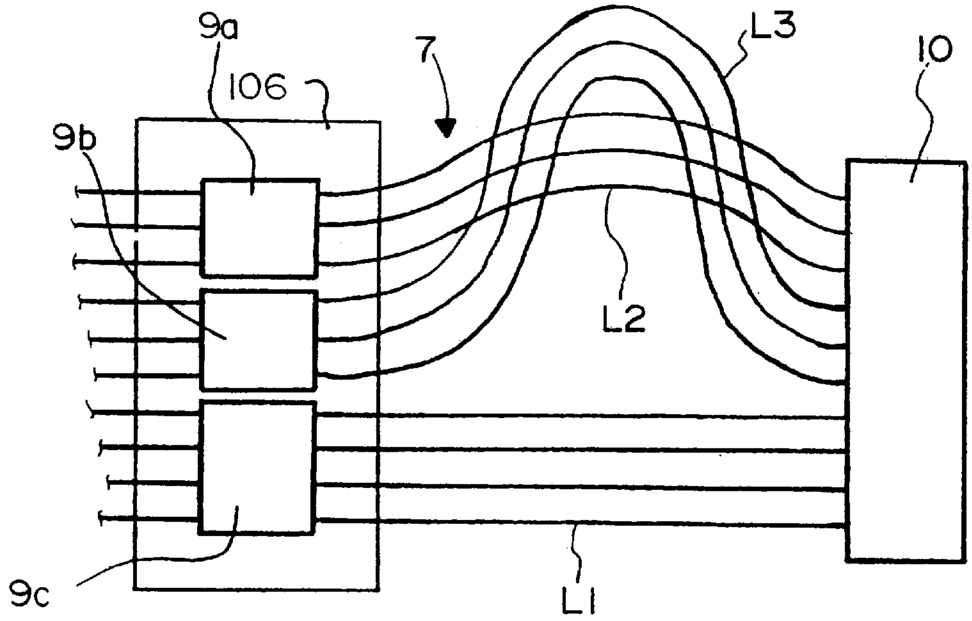
FIG. 10 a partial plan schematic view of the apparatus of FIG. 1 illustrating how the series of wires are aligned at the third step of wire measuring shown in FIG. 9.

The remaining three wires 7 which comprise the third distinct selected set of the original ten harness wires are then unclamped at the upstream wire-clamping assembly 11 and simultaneously clamped at the downstream wire-clamping assembly 21, thereby permitting further feeding of these remaining wires 7. The third and final measuring step is illustrated in FIGS. 9 & 10, where it can be seen that the wire feed drum 4 is then rotated again an additional amount $(\theta_3-\theta_2)$ such that the total rotation of the drum from its initial starting point I to the third respective endpoint $E_3$ is now equal to $\theta_3$ to thereby feed the three remaining wires 7 a distance which is equal to the third and longest length, L3, of the wires of the wire harness 98. These three wires are then cut and terminated to the third and last secondary or child connector 9*b* at the termination platform 106 to form a completed, multiple connector wire harness.

In the alternative, rather than terminating secondary or child connector 9*c* after the first wire measuring step and terminating secondary or child connector 9*a* after the second wire measuring step, the respective wires could be clamped and then terminated simultaneously with secondary or child connector 9*b*.

As a return step in the feeding of the wires, all of the wires 7 are clamped at the upstream wire-clamping assembly 11, and simultaneously unclamped at the downstream wire-clamping assembly 21. The drum 4 is rotated in a return direction (counter-clockwise in the drawings) until the downstream wire-clamping assembly 21 has reached its initial position I. Then, the wire feeding apparatus is ready to feed the wires in forming another multiple connector wire harness 98.

The clamping and unclamping operations of the upstream and downstream wire-clamping assemblies 11, 21 and the rotation of the drum 4 may be controlled with precision and in synchronization by electric control systems well known in the art.

As may be seen from FIGS. 8 & 10, the wires having the intermediate and longest lengths L2 and L3 are liable to bend up or downwards or sideways. Such bending, however, causes no adverse effect in measuring the wires, and therefore no straightening of the wires is required to correct this.

In an alternative embodiment, the wire measuring process could operate in reverse. For example, all of the wires could be fed past the termination station 3 by rotating drum 4 through an angle $\theta_3$. The secondary connectors 9*b* would then be terminated to some of the wires. The terminated wires would be unclamped at clamping assembly 21 and clamped at clamping assembly 11 and the unterminated wires clamped at clamping assembly 21 but unclamped at clamping assembly 11. The drum would then rotate back from angle $\theta_3$ to $\theta_2$ at which point secondary connectors 9*a* would be terminated. This clamping/unclamping and termination procedure would be continued until all of the wires are terminated.

It will be appreciated that the embodiments of the present invention discussed herein are merely illustrative of a few applications of the principles of the invention. Numerous modifications may be made by those skilled in the art without departing from the true spirit and scope of the invention.

We claim:

1. In an apparatus for terminating multiple connector wire harnesses, wherein each wire harness has a plurality of wires and a plurality of electrical connectors, the wires being separated into at least two distinct sets of wires, the first set being one length and the second set being a different length from said first set, a first end of each of said wires being terminated to a primary connector element, and a second end of each of said first set of wires being terminated to a first of two distinct secondary connectors, and a second end of each of said second set of wires being terminated to a second of said two distinct secondary connectors, the wire harness termination apparatus including a wire supply, means for terminating said primary and secondary connectors to said two sets of wires, a wire feeding mechanism and a wire measuring device establishing the different lengths of said first and second sets of wires, the improvement comprising:

the wire measuring device including a generally cylindrical wire measuring drum of a given radius positioned downstream of said wire supply, the wire measuring drum having an outer circumferential surface, said drum being rotatable about a central axis, said outer circumferential surface having a width sufficient to accommodate said harness wires thereon in side-by-side order, said wire measuring device further including retaining means adjacent said drum outer circumferential surface for maintaining said wires thereon in said side-by-side order, said wire measuring device further including a first wire-clamping assembly interconnected to said wire measuring drum and rotatable therewith, the first wire-clamping assembly having means for selectively clamping said wires in order to move only clamped ones of said wires upon rotation of said wire measuring drum, while permitting said wire measuring drum to rotate relative to unclamped ones of said wires, and rotation of said wire measuring drum advances said clamped wires past said terminating means for a distance equal to the product of the radius of said wire measuring drum and the angle of rotation of said wire measuring drum.

2. The improved wire harness termination apparatus as defined in claim 1, wherein said wire measuring drum has a plurality of wire-receiving channels disposed in said outer circumferential surface thereof.

3. The improved wire harness termination apparatus as defined in claim 2, wherein said wire-receiving channels include a plurality of semi-circular grooves formed in said wire measuring drum outer circumferential surface.

4. The improved wire harness termination apparatus as defined in claim 1, wherein said first wire-clamping assembly includes a plurality of individual clamping members corresponding in number to said plurality of wires, each of said clamping members being selectively actuatable in order to selectively clamp one of said wires against a reaction surface.

5. The improved wire harness termination apparatus as defined in claim 1, wherein said retaining means comprises a cover member including a flexible belt having a width no greater than said width of said wire measuring drum outer circumferential surface.

6. The improved wire harness termination apparatus as defined in claim 5, further including means for maintaining said cover member in close proximity to said wire measuring drum outer circumferential surface.

7. The improved wire harness termination apparatus as defined in claim 6, wherein said cover proximity maintaining means includes a tensioning member which engages an opposite end of said cover member and an idler roller interposed between the tensioning member and said wire measuring drum, said idler roller being disposed against said cover member and adjacent said outer circumferential surface to maintain said cover member in place over said wires.

8. The improved wire harness termination apparatus as defined in claim 1, further including a second wire-clamping assembly disposed proximate to said wire supply and upstream of said first wire-clamping assembly.

9. The improved wire harness termination apparatus as defined in claim 8, wherein each of said first and second wire-clamping assemblies include a plurality of individual clamping members corresponding in number to said plurality of wires, each of said clamping members being selectively actuatable in order to selectively clamp said wires.

10. The improved wire harness termination apparatus as defined in claim 9, wherein said first and second wire-clamping assemblies are operatively interconnected by control means which synchronizes the actuation of said first and second wire-clamping assemblies, whereby one of said first wire-clamping assembly clamping members is selectively actuated to clamp one of said wires into contact with said wire measuring drum while a corresponding one of said second wire-clamping assembly clamping members is selectively actuated to unclamp said one wire to thereby permit movement of said one wire by said wire measuring drum from said wire supply to said terminating means, while a second of said first wire-clamping assembly clamping members is actuated to unclamp a second wire and a second of said second wire-clamping assembly clamping members is actuated to clamp said second wire to restrain said second wire from advancement due to rotation of said wire measuring drum.

11. The improved wire harness termination apparatus as defined in claim 8, wherein said first and second wire-clamping assemblies are pneumatically actuated.

12. A rotary drum type wire measuring apparatus for use in forming multiple connector wire harnesses, each wire harness having a plurality of wires and a plurality of electrical connectors, the wires being separated into at least two distinct sets of wires, the first set being one length and the second set being a different length from said first set, a first end of each of said wires being terminated to a primary connector element, and a second end of each of said first set of wires being terminated to a first of two distinct secondary connectors, and a second end of each of said second set of wires being terminated to a second of said two distinct secondary connectors, said measuring apparatus being used in connection with a wire termination mechanism for terminating said wires to said connectors, a first wire-clamping mechanism and a second wire-clamping mechanism, said measuring apparatus comprising: a rotary drum rotatable about a fixed axis, said drum including a portion having a predetermined radius and a plurality of grooves formed in an outer circumferential working surface thereof, the grooves receiving said harness wires therein, said apparatus further including said first wire-clamping mechanism rotatable with said rotary drum for selectively clamping said wires extending around said rotary drum in said grooves thereof, whereby measuring said wires to selected different lengths past said termination station is effected by rotating said rotary drum through preselected angles with the second wire-clamping mechanism releasing selected wires and the first wire-clamping mechanism clamping said selected wires, while preventing feeding of remaining ones of said wires by clamping said remaining wires with said second wire-clamping mechanism and unclamping said remaining wires with said first wire-clamping mechanism, thus providing desired combinations of different wire lengths by selectively effecting the clamping and unclamping of the first and second wire clamping mechanisms in connection with rotation of the rotary drum, and further including a cover belt extending over a substantial portion of the circumferential working surface of the rotary drum to retain said harness wires in said drum grooves between said belt and said grooves and wherein one end of said cover belt engages said rotary drum and another end is received by a belt-tensioning member.

13. A rotary drum type wire measuring apparatus for use in forming multiple connector wire harnesses, each wire harness having a plurality of wires and a plurality of electrical connectors, the wires being separated into at least two distinct sets of wires, the first set being one length and the second set being a different length from said first set, a first end of each of said wires being terminated to a primary connector element, and a second end of each of said first set of wires being terminated to a first of two distinct secondary connectors, and a second end of each of said second set of wires being terminated to a second of said two distinct secondary connectors, said measuring apparatus being used in connection with a wire termination mechanism for terminating said wires to said connectors, a first wire-clamping mechanism and a second wire-clamping mechanism, said measuring apparatus comprising: a generally cylindrical rotary drum having a given radius rotatable about a fixed axis, said drum including a plurality of grooves formed in an outer circumferential working surface thereof, the grooves receiving said harness wires therein, said apparatus further including said first wire-clamping mechanism rotatable with said rotary drum for selectively clamping said wires extending around said rotary drum in said grooves thereof, whereby measuring said wires to selected different lengths past said termination station is effected by rotating said rotary drum through preselected angles with the second wire-clamping mechanism releasing selected wires and the first wire-clamping mechanism clamping said selected wires, while preventing feeding of remaining ones of said wires by clamping said remaining wires with said second wire-clamping mechanism and unclamping said remaining wires with said first wire-clamping mechanism, thus providing desired combinations of different wire lengths by selectively effecting the clamping and unclamping of the first and second wire clamping mechanisms in connection with rotation of the rotary drum and whereby rotation of said rotary drum advances said clamped wires past said wire termination mechanism for a distance equal to the product of the radius of said rotary drum and the angle of rotation of said rotary drum.

14. The rotary drum type wire measuring apparatus as defined in claim 13 further comprising means for retaining said wires adjacent said plurality of grooves formed in the outer circumferential working surface of said drum.

15. The rotary drum type wire measuring apparatus as defined in claim 14 wherein said retaining means comprises a cover belt extending over a substantial portion of the circumferential working surface of the rotary drum, the cover belt retaining said harness wires in said drum grooves between said belt and said grooves.

16. The rotary drum type wire measuring apparatus as defined in claim 15 wherein one end of said cover belt engages said rotary drum and another end is received by a belt-tensioning member to maintain said belt against said circumferential working surface.

* * * * *